Sept. 6, 1932. F. D. HOLST 1,875,605
GRAIN HARVESTER AND STACKER
Filed May 26, 1930 2 Sheets-Sheet 2
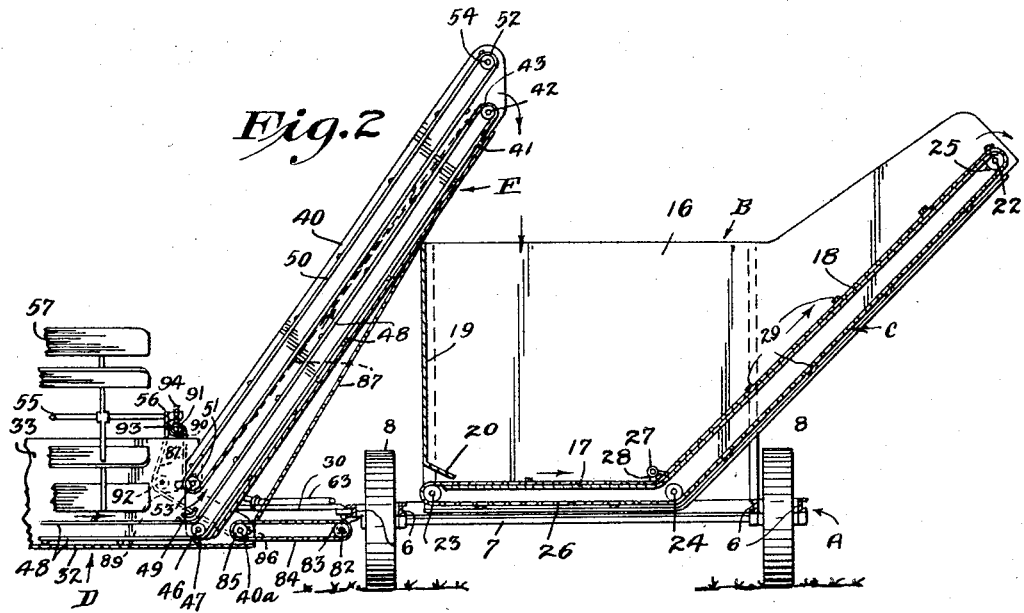
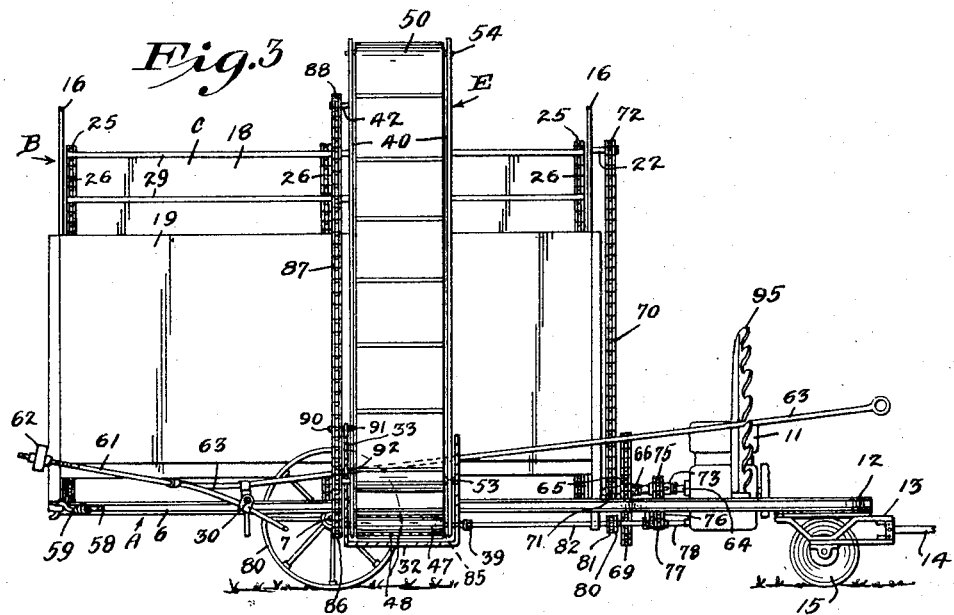
Inventor
Fred D. Holst
By his Attorneys
Williamson & Williamson Patented Sept. 6, 1932

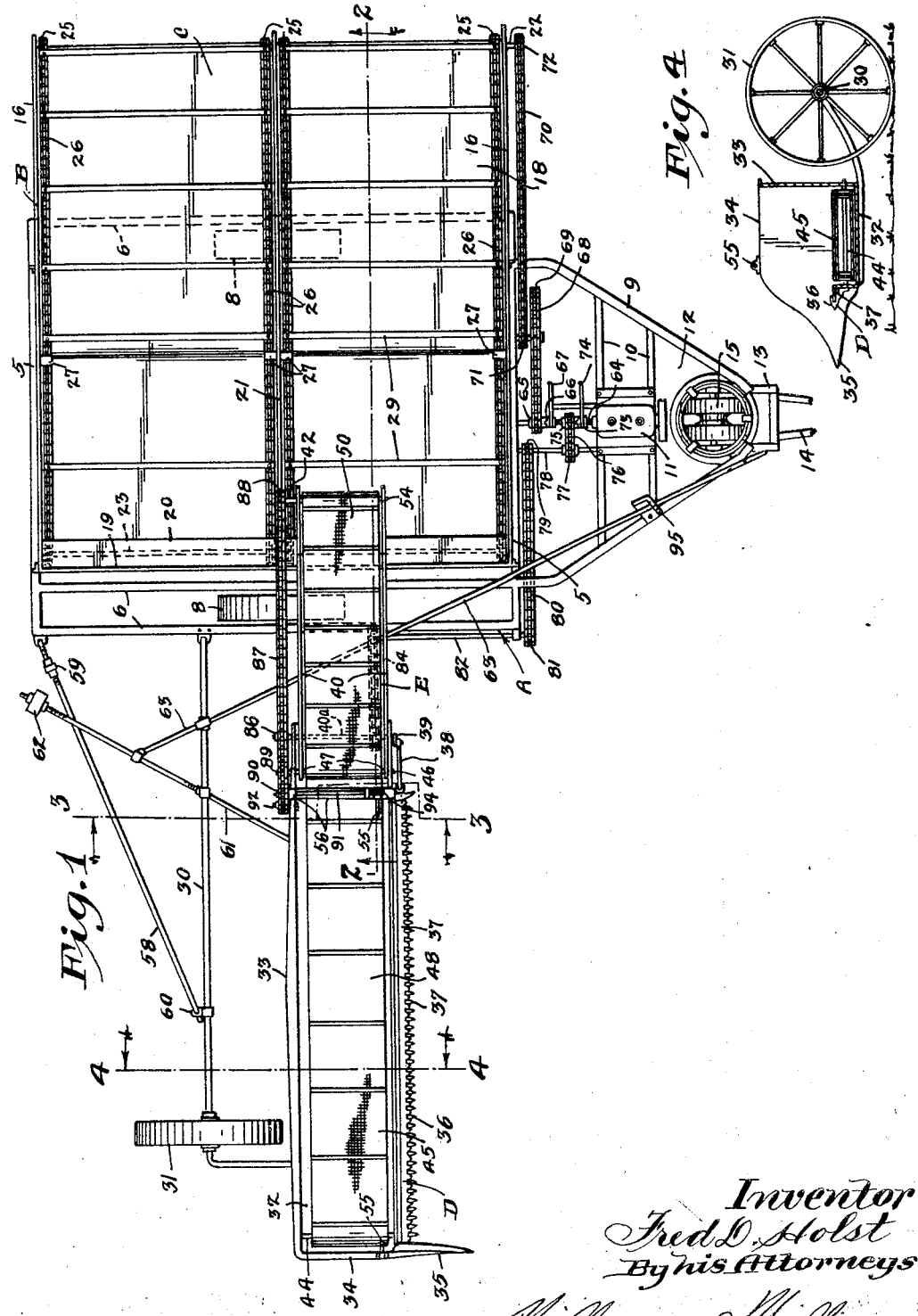

1,875,605

UNITED STATES PATENT OFFICE

FRED D. HOLST, OF MAKOTI, NORTH DAKOTA

GRAIN HARVESTER AND STACKER

Application filed May 26, 1930. Serial No. 455,704.

This invention relates to grain harvesting and stacking machines.

At the present time in the prairie districts of the United States, combined grain harvesting and threshing machines are extensively used. The machines cut the grain in the field and thresh it in the field immediately after being cut without allowing the grain to first cure. As a result, the grain operated upon by these "combines" must be absolutely ripe at the time it is cut, no opportunity being given to the grain to cure and ripen after it is cut and before it is threshed. When entirely ripened grain is cut, there is a good deal of wastage of the grain for the reason that quite a large proportion of the fruit of the grain falls from the stalk on the ground as it is cut. In place of the combine therefor, windrow harvesters have come into use and these harvesters cut the grain just before it is dead ripe and pile the grain in windrows in the field where the grain is allowed to cure for a short time and mature before it is gathered and threshed. When the grain is gathered from these windrows for conveyance to the threshing machine, quantities of the grain are lost on the ground in rehandling the grain. Of course, the expense and labor involved in binding the grain is eliminated by use of either the combine or the windrow harvester.

It is the object of the present invention to provide a machine which will cut the grain and deliver the grain into a box body as cut, whereupon when the box body becomes filled with the grain, the machine can be driven to a position where it is desired to thresh the grain and the grain can there be conveyed from the box body onto a stack where the grain can cure for a short time preparatory to the threshing of the same. Such a machine eliminates the expense and labor of binding the grain when it is cut; eliminates the loss of grain occasioned by use of either the combine or the windrow harvester; permits the grain to be properly cured before threshing and it eliminates rehandling of the grain after the grain is cut until it is fed to the threshing machine. It also eliminates the need for complicated and expensive machinery in harvesting grain.

The present invention consists in the novel parts and novel combinations of parts, hereinafter defined in the claims and described in the following specification, made in connection with the accompanying drawings, wherein like reference characters refer to the same or similar parts throughout the various views and, in which, Fig. 1 is a plan view of a machine embodying the present invention, the reel shaft of the cutting mechanism being broken away and the reel removed;

Fig. 2 is a vertical section taken on the line 2—2 of Fig. 1, as indicated by the arrows;

Fig. 3 is a vertical section taken on the line 3—3 of Fig. 1, as indicated by the arrows, and Fig. 4 is a vertical section taken on the line 4—4 of Fig. 1 as indicated by the arrows.

Referring to the drawings, the machine of the present invention includes essentially a wheeled frame A, a box body B, one or more conveyors C for removing grain from the box body B, a grain cutting mechanism D and a carrier and elevator E adapted to receive the grain from the cutting mechanism D and discharge the same into the box body B.

The frame A of the machine preferably includes front and rear transverse bars 5 and two pair of closely spaced longitudinal bars 6 running between the front and rear bars 5, one pair of the bars 6 being at one side of the machine and the other pair of bars 6 being at the opposite side of the machine. An axle 7 is mounted in suitable bearings carried on the under sides of the various bars 6 and a pair of ground engaging wheels 8 are mounted on the axle 7, one wheel being mounted between the two bars of one pair of bars 6 and the other wheel being mounted between the two bars of the other pair of bars 6. The frame A extends forwardly from the front bar 5 and forms a triangular front portion 9 braced by two transverse bars 10 upon which an internal combustion, or other type of engine 11 is preferably mounted. A platform 12 extends across the extreme forward portion of the triangular portion 9 of the frame A and rotatably mounted on this platform 12 for turning movement about a vertical axis is a carriage 13 to which draw bars 14 are secured and one or more wheels 15 are journaled in this carriage. The wheels 15 will support the front end of the machine, while the wheels 8 will support the rear portion of the machine and will chiefly carry the weight of the box body B. The box body B includes front and rear walls 16 having outwardly and upwardly projecting arms at one side thereof. The arms of the walls 16 extend from the left side of the machine as illustrated on the drawings, and looking in the direction towards which the machine will travel, and the said arms project for a considerable distance outwardly beyond the left wheel 8. A bottom deck 17 extends between the two walls 16 adjacent the lower edges thereof and this bottom deck 17 is secured at its left edge to an upwardly and outwardly inclined deck 18 which extends between the arms of the walls 16. The inclined deck 18 terminates at its upper end in a slightly outwardly and downwardly curved portion. Between the right edges of the two walls 16, there is provided a side wall 19 which projects downwardly from the tops of the walls 16 to a line adjacent but spaced slightly above the bottom deck 17 where the wall 19 is bent inwardly at a sharp angle to form an inclined apron 20 leading downwardly toward the bottom deck 17. Midway between the front and rear edges of the decks 17 and 18, an upstanding flange 21 is secured to the decks which divides the decks into front and rear sections.

The conveyors C include a driving shaft 22 which extends between and is journaled in the extreme outer portions of the arms of the front and rear walls 16 below the outer curved portion of the inclined deck 18. Another shaft 23 extends between and is journaled in the front and rear walls 16 adjacent to the right hand edge of the bottom deck 17 and below the apron 20. A third shaft 24 extends between the front and rear walls 16 below the inclined deck 18 adjacent the line where the inclined deck is secured to the bottom deck 17. Each of the shafts 22, 23 and 24 carry four sprockets 25 thereon, one of the said sprockets on each shaft being rearwardly disposed from but adjacent the front wall 16, one of the sprockets on each shaft being forwardly disposed from but adjacent the flange 21, one of the sprockets on each shaft being rearwardly disposed from but adjacent the flange 21, and the remaining sprocket on each shaft being forwardly disposed from but adjacent the rear wall 16. The various sprockets adjacent and slightly rearwardly disposed from the front wall 16 are in transverse alinement with each other; the various sprockets adjacent and forwardly spaced from the flange 21 are in transverse alinement with each other and the various sprockets adjacent and rearwardly disposed from the flange 21 are in transverse alinement with each other and the various sprockets adjacent but forwardly disposed from the rear wall 16 are in transverse alinement with each other. Endless sprocket chains 26 are trained over the various sprockets 25 in transverse alinement with each other and the upper runs of these chains are held in close engagement with the bottom deck 17 and the inclined deck 18 by means of small rollers 27 bearing against the top sides of the chains 26 adjacent the joining angle between the bottom deck 17 and the inclined deck 18. The rollers 27 are journaled in small brackets 28 carried respectively by the front and rear walls 16 and the flange 21. Extending between and secured to the two forward sprocket chains 26 and extending between and secured to the two rearmost chains 26 respectively, are spaced bars or slats 29. The upper runs of these slats work against the decks 17 and 18.

The cutting mechanism D may be practically of any desired type and may be secured to the opposite side of the frame A from the direction of extension of the inclined deck 18 in practically any desired manner, but the said grain cutting mechanism will preferably be constructed as follows:—

Pivotally mounted on the extreme right hand bar 6 of the frame is a shaft 30 which projects outwardly and to the right of the frame A. This shaft carries adjacent its outer end a grain wheel 31 and is provided with a right angular bend outwardly from the grain wheel and is curved downwardly and secured to the bottom of a grain platform 32. The grain platform 32 preferably has a rear wall 33 projecting upwardly therefrom and joining an outer end wall 34 to which a divider 35 is secured. The forward edge of the platform 32 carries the usual sickle knife guards 36 across which a sickle knife 37 extends for cooperation with the blades carried by the guards. The sickle knife 37 is actuated by a pitman 38 pivoted at its inner end to a crank 39 carried by a driving shaft 40a journaled in the inner end of the platform 32.

The conveyor and elevator E includes a pair of long spaced side boards 40 pivoted to the grain platform 32 and extending diagonally upwardly and inwardly therefrom to a point above the box body B. The bottom board 41 connects the side boards 40 and rests adjacent its upper end against the upper edge of the side wall 19 of the box body B. A driving shaft 42 is journaled in the upper ends of the two side boards 40 and extends between the same and carries a roller 43 thereon. Another roller shaft 44 is journaled in the walls of the grain platform 32 and carries a roller 45. A third shaft 46 is journaled in the lower ends of the side boards 40 and carries a roller 47. An endless canvas belt 48 runs over the rollers 43, 45 and 47 and carries slats thereon at spaced intervals. Curved plates 49 secured to the lower portions of the side boards 40 immediately above the belt 49 maintain the belt in such position that the portion of the belt 48 over the grain platform will be approximately horizontally disposed, while the portion of the belt between the side boards 40 will extend parallel to these boards. An endless canvas belt 50 having spaced slats thereon runs over rollers 51 and 52 carried on roller shafts 53 and 54 respectively journaled in the side boards 40, shaft 53 being a driving shaft and journaled adjacent the lower ends of the side boards 40, while the shaft 54 is an idler shaft and is journaled adjacent the extreme upper ends of the side boards 40. The two belts 50 and 48 are so arranged that the upper run of the inclined portion of the belt 48 will be in close proximity to and in parallel relation with the lower run of the belt 50.

A reel shaft 55 is mounted in suitable standards 56 secured to the grain platform 32 and carries a reel 57 adapted to operate to throw the standing grain into the sickle knife 37 and guards 36. In order to brace the grain cutting mechanism, a long rod 58 is provided having a turn buckle 59 or other equivalent shortening and lengthening mechanism therein and this rod is pivotally connected at its rear end to the rear right hand corner of frame A and releasably pivotally connected at its forward end to a small bracket 60 carried on the shaft 30. Another rod 61 is secured to the rear side of the grain platform 32; is secured to the shaft 30 and carries at its rear end a weight 62 adapted to be adjusted to and from the shaft 30 on the rod 61 as by screw threaded adjustment and this weight is provided to counterbalance the weight of the cutting mechanism D or, at least, partially counterbalance the same so as to prevent swinging movement of the shaft 30. In order that the forward edge of the grain platform 32 may be held at a desired level, for the proper action on the grain, a long rod 63 is provided which is secured both to the shaft 30 and the rod 61 and runs forwardly to fit within one of the notches of a series of notches formed on a standard 95 carried on the front triangular portion 9 of the frame A. It will be seen that the shaft 30 and the whole grain cutting mechanism can be tipped by moving the forward end of the rod 63 from one of the notches in the standard 95 to another notch therein. Accordingly, the forward edge of the grain cutting mechanism can be conveniently raised and lowered.

The shaft 64 of the engine 11 extends rearwardly from the engine and it is journaled in the front bar 5 of the frame A. Journaled on the said shaft 64 is a sprocket 65 forming at its outer side a clutch member adapted to be engaged at times with a clutch member 66 pinned for sliding movement on the shaft 64 and adapted to be operated by means of a lever 67 to be thrown into and out of engagement with the clutch member on the sprocket 65. A sprocket chain 68 runs over the sprocket 65 and over another sprocket 69 mounted on the forward end of the shaft 24 outwardly from the front wall 16. Another sprocket chain 70 runs over a sprocket 71 on the forward end of the shaft 24 and also runs over a sprocket 72 carried on the forward end of the shaft 22. It will be readily seen that when the clutch member 66 is thrown into engagement with the clutch member on the sprocket 65, the driving shaft 22 of the conveyors C will be driven and the slat and chain conveyors will be moved over the decks 17 and 18 in the direction indicated by the arrows Fig. 2.

Also pinned to the shaft 64 for sliding movement thereon is a clutch member 73 adapted to be shifted by means of a lever 74 to be thrown in and out of engagement with a clutch member formed on a sprocket 75 journaled on the shaft 64. A sprocket chain 76 runs over the sprocket 75 and over another sprocket 77 on a counter shaft 78 journaled in one of the bars 10 and the forward bar 5 of the frame. A sprocket 79 is secured to the shaft 78 and a sprocket chain 80 runs over the sprocket 79 and over a sprocket 81 carried on the forward end of a shaft 82 journaled in suitable bearings carried by the right hand bar 6 and extending rearwardly to a point below the elevator E. Shaft 82 carries a sprocket 83 at its rear end and a sprocket chain 84 runs over the sprocket 83 and a sprocket 85 carried adjacent the forward end of the shaft 40a. The rear end of the shaft 40a carries a sprocket 86 and a sprocket chain 87 runs over the sprocket 86, a sprocket 88 mounted on the rear end of the shaft 42, a sprocket 89 mounted on the rear end of the shaft 53 and a sprocket 90 carried on an upper shaft 91 mounted adjacent the reel shaft 55. The sprocket chain 87 also runs over a pulley 92 mounted on the rear wall 33 of the grain platform. The shaft 91 carries a worm 93 engaging a worm gear 94 on the reel shaft 55. It will be seen when the lever 24 is operated to throw the clutch member 74 into engagement with the clutch member on the sprocket 75, pitman 38 will be actuated from the crank 39 to oscillate the sickle knife 37 and the reel shaft 55 will be actuated to move the reel 57. Also the belt 50 of the conveyor will be actuated so that its lower run will move upwardly, while belt 48 will be actuated so that its upper run moves inwardly towards the box body B and upwardly.

In use, the machine will be drawn over the grain field by means of a tractor or the like attached to the draw bars 14. The cutting mechanism will be set in operation to cut the grain and the belt 48 will receive the grain and in cooperation with the belt 50, will convey the grain upwardly and over the top of the box body B to discharge the same into the box body. The apron 20 will prevent the grain in the box body from being discharged between the lower edge of the side wall 19 and the upper runs of the slat and chain conveyors C. When the box body B has been filled with the grain, the machine will be driven off the field to a point where it is desired to stack the grain for threshing and the cutting mechanism will be put out of operation. The two conveyors C will then be set in operation and the slats 29 running over the decks 17 and 18 will convey the grain in the box body B upwardly and outwardly to discharge the grain on to a stack. The grain may be allowed to stand in the stack until it has completely cured and ripened, whereupon it may be fed to a threshing machine and threshed. It will be seen that the grain can be cut when it is not absolutely dead ripe and, accordingly, very little grain will be lost during the cutting operation and no grain will be lost in handling the grain prior to such time as the grain is ready to thresh. But a single machine is used for cutting the grain, conveying the same to a point where it is desired to stack the same for threshing and for stacking the grain. Although it is preferred to mount the power plant for actuating the various mechanism of the machine directly on the machine, it will be understood that if desired, the internal combustion engine 11 may be eliminated and power may be supplied to the various moving parts of the machine as from the draft vehicle.

The present device is simple in construction and in operation.

It will, of course, be understood that various changes may be made in the form, details, arrangement and proportions of the various parts without departing from the scope of the present invention.

What is claimed is:—

1. A combined grain harvesting and stacking machine comprising a wheeled frame, a box body carried by said frame, a grain cutting mechanism mounted at one side of said frame, an endless carrier adapted to receive the grain as cut by said cutting mechanism and to elevate the same to be discharged into said box body, said box body having an upwardly and outwardly inclined deck at a side thereof other than the side adjacent said cutting mechanism, an endless conveyor working over said deck, means for driving said cutting mechanism and said carrier and means for driving said conveyor.

2. A combined grain harvesting and stacking machine having in combination a box body mounted on wheels, a grain cutting mechanism supported from said box body and projecting from one side thereof, an inclined elevator adapted to receive the grain from said cutting mechanism and elevate the same to a point above said box body and there discharge the same, an inclined deck projecting upwardly and outwardly from the opposite side of said box body from said cutting mechanism, a slat and chain conveyor working over said deck and adapted to move the grain from said box body and discharge the same on to a stack, means for driving said cutting mechanism and said elevator and means for driving said conveyor.

3. A combined grain harvesting and stacking machine having in combination a wheeled frame, a box body mounted on said frame and having a bottom deck, an inclined deck projecting upwardly and to one side of said bottom deck, a chain and slat conveyor working over said bottom and inclined decks, a grain cutting mechanism supported at one side of said frame and a steeply inclined elevator adapted to receive the grain from said cutting mechanism and convey the same over the top of said box body to discharge the grain into said box body.

4. A combined harvesting and stacking machine for grain comprising a suitable wheel supported frame, a box body mounted on said frame and having a bottom deck and an inclined deck joining said bottom deck and projecting upwardly and outwardly beyond one side of said frame, a grain cutting mechanism pivotally attached to an opposite side of said frame from the side beyond which said inclined deck projects, an angularly bent shaft applied to said cutting mechanism and projecting rearwardly therefrom, a grain wheel journaled on said shaft and supporting the outer end of said cutting mechanism, means for tilting said shaft to vary the elevation of said cutting mechanism, an elevator adapted to receive the grain from said cutting mechanism and discharge the same at a point above said box body, a conveyor working over said bottom and inclined decks, means for driving said cutting mechanism and said elevator and means for driving said conveyor.

5. The structure defined in claim 4, and weighted means secured to said cutting mechanism and projecting rearwardly from said shaft to balance the weight of said cutting mechanism.

In testimony whereof I affix my signature.

FRED D. HOLST.